United States Patent [19]
Clark et al.

[11] Patent Number: 5,816,912
[45] Date of Patent: Oct. 6, 1998

[54] SCISSORS ACTION SEPARATOR-CONVEYOR AND METHODS OF USING THE SAME

[76] Inventors: George W. Clark, Rte. 1, Box 281, Scotland Neck, N.C. 27874-0281; Leland Hodge Kitchen, III, Rte. 1, Scotland, N.C. 27874

[21] Appl. No.: 761,283

[22] Filed: Dec. 6, 1996

[51] Int. Cl.⁶ .................................................. A01D 33/02
[52] U.S. Cl. ......................... 460/114; 460/97; 460/149; 460/904; 171/28; 171/DIG. 1
[58] Field of Search .............................. 460/114, 97, 115, 460/118, 126, 130, 149, 150, 904; 171/27, 30, 36, 41, 42, 28, DIG. 1; 56/12.2

[56] References Cited

U.S. PATENT DOCUMENTS

| | | | |
|---|---|---|---|
| 2,513,480 | 7/1950 | Heth ..................................... | 460/118 X |
| 2,997,086 | 8/1961 | Armer .................................. | 460/114 X |
| 3,294,177 | 12/1966 | Schaal et al. .............................. | 171/42 |
| 3,568,683 | 3/1971 | Sutton et al. ........................ | 460/130 X |
| 5,156,570 | 10/1992 | Justice, III ............................ | 56/12.2 X |

*Primary Examiner*—Terry Lee Melius
*Attorney, Agent, or Firm*—Mills Law Firm PLLC

[57] ABSTRACT

This invention is a separator-conveyor that uses a scissors action to cut stems, roots, vines and other debris from a crop being harvested and processed. This is accomplished by providing a plurality of multi-sided rollers having sharp edges disposed alternately at an angle to adjacent rollers causing a scissors type cutting action that starts at one end of such rollers and continues to the other end. A plurality of the scissors action separator-conveyors can be used in conjunction with drying systems on a crop harvester-processor. This harvester-processor allows root crops such as peanuts to be harvested, cleaned, dried and graded in one continuous operation.

16 Claims, 6 Drawing Sheets

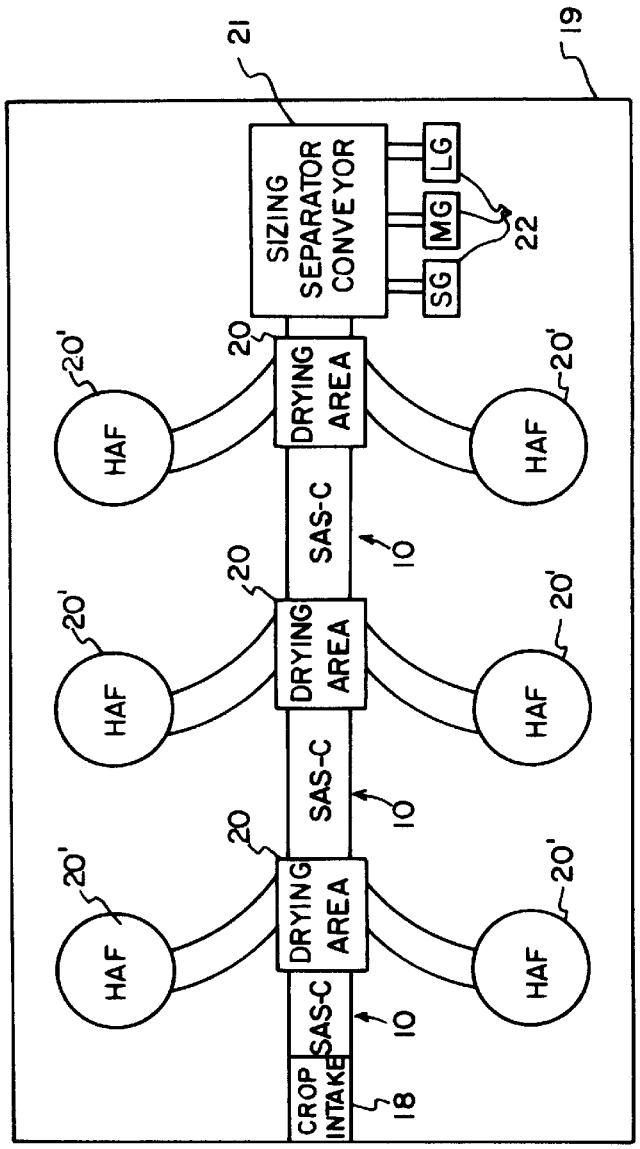
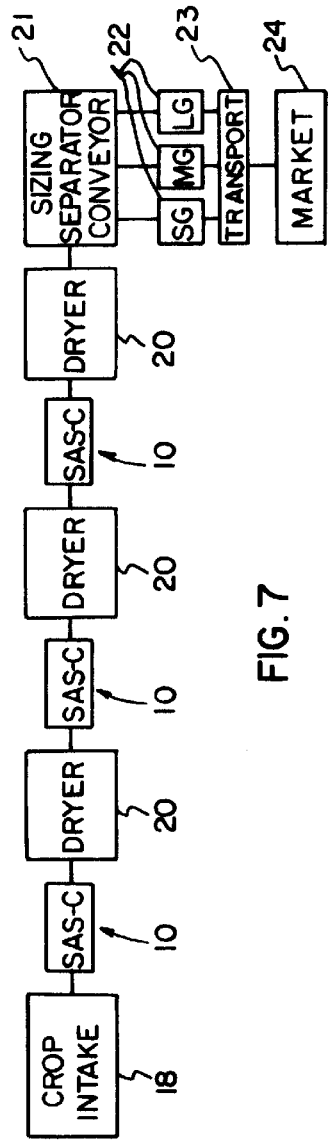
FIG. 6
FIG. 7

SCISSORS ACTION SEPARATOR-CONVEYOR AND METHODS OF USING THE SAME

FIELD OF INVENTION

This invention relates to agricultural equipment and more particularly to separator-conveyor systems and methods of using the same.

BACKGROUND OF INVENTION

In the harvesting of crops, separator-conveyors are routinely used to remove dirt and debris from the crop being harvested. This is particularly true in the harvesting of root crops such as potatoes, carrots, radishes, peanuts and the like.

In the harvesting of some root crops, the foliage or vines are separated from the root crop prior to digging and harvesting. In this instance the separator-conveyor is mounted directly behind the digger blade so that dirt and other debris can be separated from the crop prior to any further processing.

In crops like peanuts, the crop is dug and windowed for three to five days to allow the peanuts to partially dry. A peanut combine then harvests the crop, separates the peanuts from the vines, and deposits the vines back on the ground. In this process a separator-conveyor is used to remove dirt and other debris from the peanuts prior to further processing.

Separator-conveyors have historically been composed of parallel rods that carry the crop with a shaker attached thereto to cause dirt and other debris to separate out and fall through the openings between the rods. Some of these separator-conveyors have different configurations formed on a plurality of rollers to aide in the removal of dirt and other debris. None of these prior known separator-conveyors, however, have been able to cut stems, roots and other debris from the crop.

CONCISE EXPLANATION OF PRIOR ART

U.S. Pat. No. 2,997,086, to Austin A. Armer discloses a beet screening and cleaning device including separator-conveyor units with both square-in-cross-section rollers and spiral rollers.

U.S. Pat. No. 81,980, to Albert Burhaus discloses the use of square rollers with outwardly projecting flanges in a potato digger.

U.S. Pat. No. 5,076,046, to Clinton Schilling is considered of interest in that it discloses a harvester for vine crops, including hexagonal rollers with a plurality of tines outwardly projecting therefrom.

U.S. Pat. No. 2,974,793, to Robert S. Kuntz is considered of interest in that it discloses a rotary sizing mechanism including square-in-cross section rollers with outwardly projecting lips for sizing ore.

U.S. Pat. No. 4,633,956, to Nils B. Glifberg and Wilhelm Bengtsson discloses a more or less conventional sugar beet conveyor-separator using a plurality of bars as the conveying means.

U.S. Pat. No. 436,049, to Rama R. Watters discloses a screening device having alternate conical rollers.

U.S. Pat. No. 746,714, to Charles W. Lasiter discloses a peanut stemmer in the form of a plurality of rollers.

BRIEF DESCRIPTION OF INVENTION

After much research and study into the above mentioned problems, the present invention has been developed to provide a separator-conveyor that uses a scissors action to cut stems, roots, vines, and other debris from the crop being harvested while at the same time causing such crop to rotate so that all sides of the same are exposed to the cutting action.

The above is accomplished by providing a plurality of square-in cross-section rollers having sharp edges disposed alternatively at an angle to the adjacent rollers so that the cutting edges of adjacent rollers contact each other. This causes a scissors type cutting action that starts at one end of such rollers and, as they continue to turn, will move across to the other end of the same. As the multi-sided rollers turn prior to the next cutting action, the crop bounces and rolls so that all sides thereof are exposed to the cutting action before the crop leaves the separator-conveyor.

The present invention can be used in conjunction with crop diggers if the associated foliage has been removed by mowing, forage harvesting or other cutting means as well as harvesting or combining of crops that have previously been dug and air dried.

In addition to the above, the scissors action separator-conveyor of the present invention can be used in conjunction with hot air or microwave furnaces to complete the drying process on the harvester. The peanuts are then passed through a conventional sizing separator-conveyor and exit into separate small, medium and large grades which are placed in separate storage bins or other suitable containers for transport to market.

In view of the above it is the object of the invention to provide a separator-conveyor that effectively removes debris attached to the crop being harvested.

Another object of the present invention is to provide a separator-conveyor that cuts roots, vines, stems and the like from the crop being harvested.

Another object of the present invention is to provide a separator-conveyor that not only cuts vines, stems, roots and the like from the crop being harvested but also imparts to such crop a bumping and rolling action to expose all sides of such crop to the cleaning action.

Another object of the present invention is to provide a plurality of scissor action separator-conveyors used in conjunction with drying systems such as gas fired hot air or microwave furnaces and at least one sizing separator-conveyor to dry and grade the peanuts on the harvester to produce peanuts ready for market.

Other objects and advantages of the present invention will become apparent and obvious from a study of the following description and the accompanying drawings which are merely illustrative of such invention.

BRIEF DESCRIPTION OF DRAWINGS

FIG. 6 is a somewhat schematic view of the Scissors Action Separator-conveyor of the present invention and incorporated into a harvester drying system; and FIG. 7 is a block diagram of the harvester and drying process of the present invention.

DETAIL DESCRIPTION OF INVENTION

With further reference to the drawings, the scissors action separator-conveyor of the present invention, indicated generally at 10, includes a left support frame 11a and a right support frame 11b at opposite ends of the conveyor-cutter rollers 12.

Figures 1, 2:
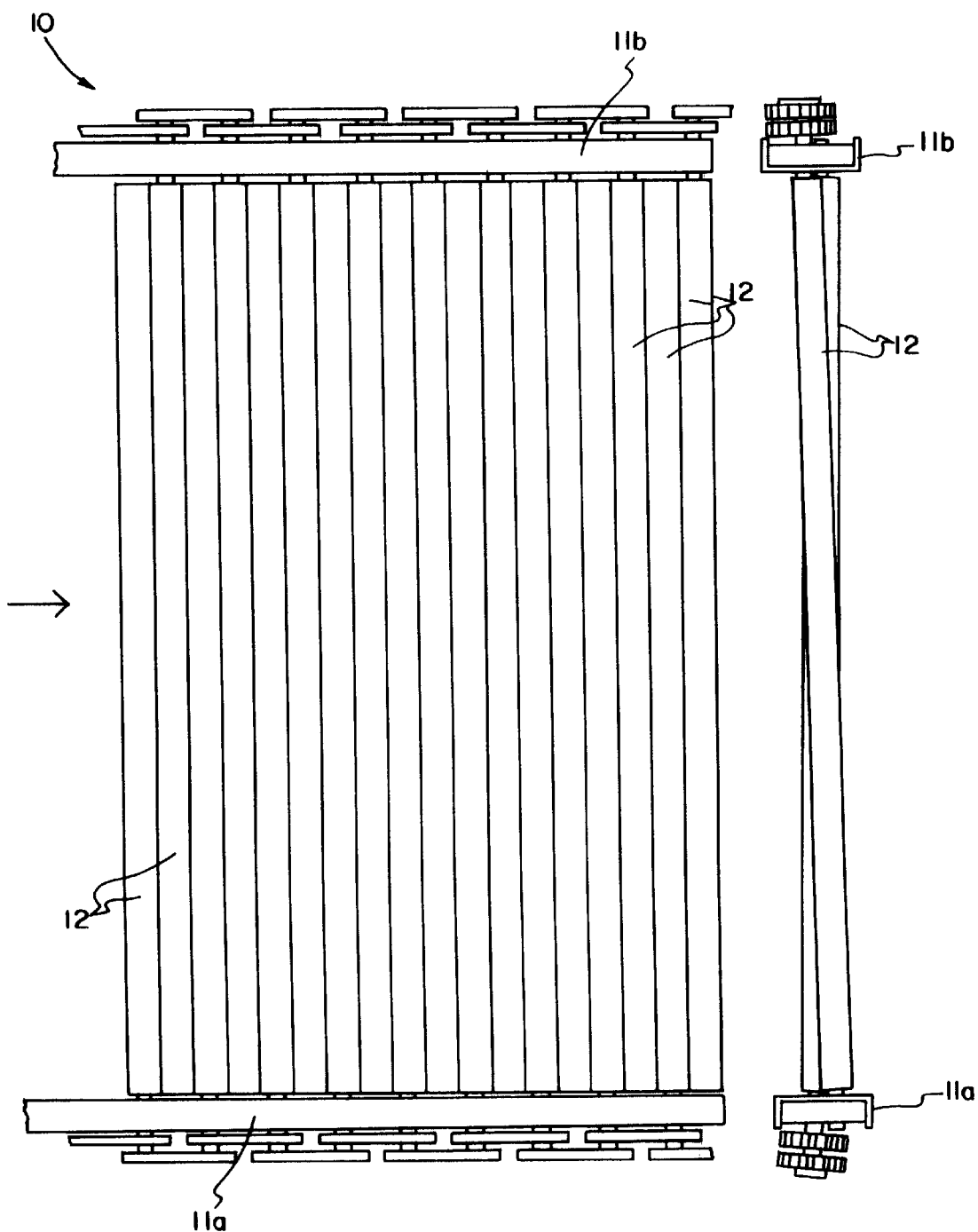
FIG. 1 is a top plan view of the scissors action separator-conveyor of the present invention.
FIG. 2 is an end elevational view thereof.
Figure 3:
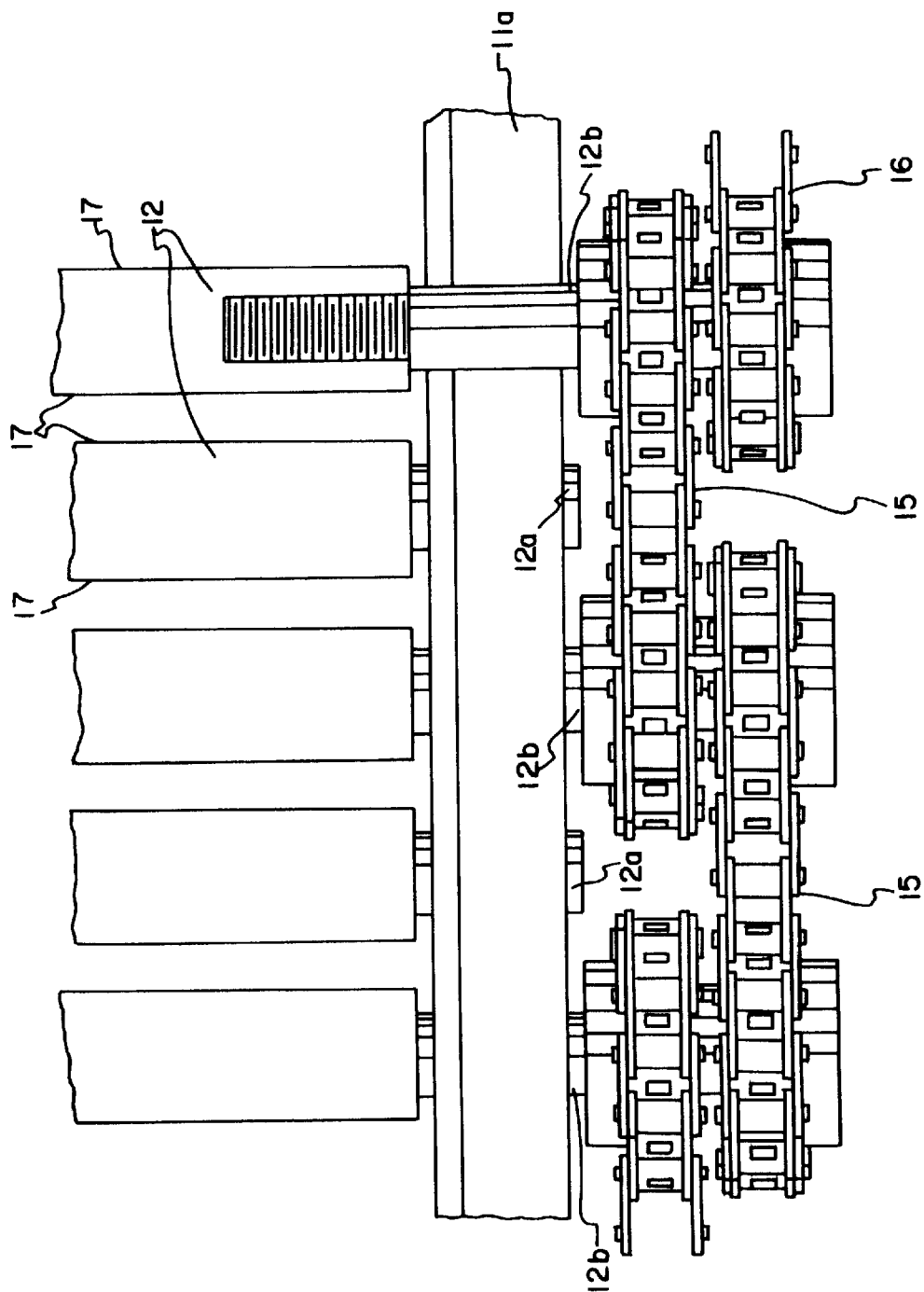
FIG. 3 is an enlarged top plan view of the drive system of the present invention.
Figure 4:
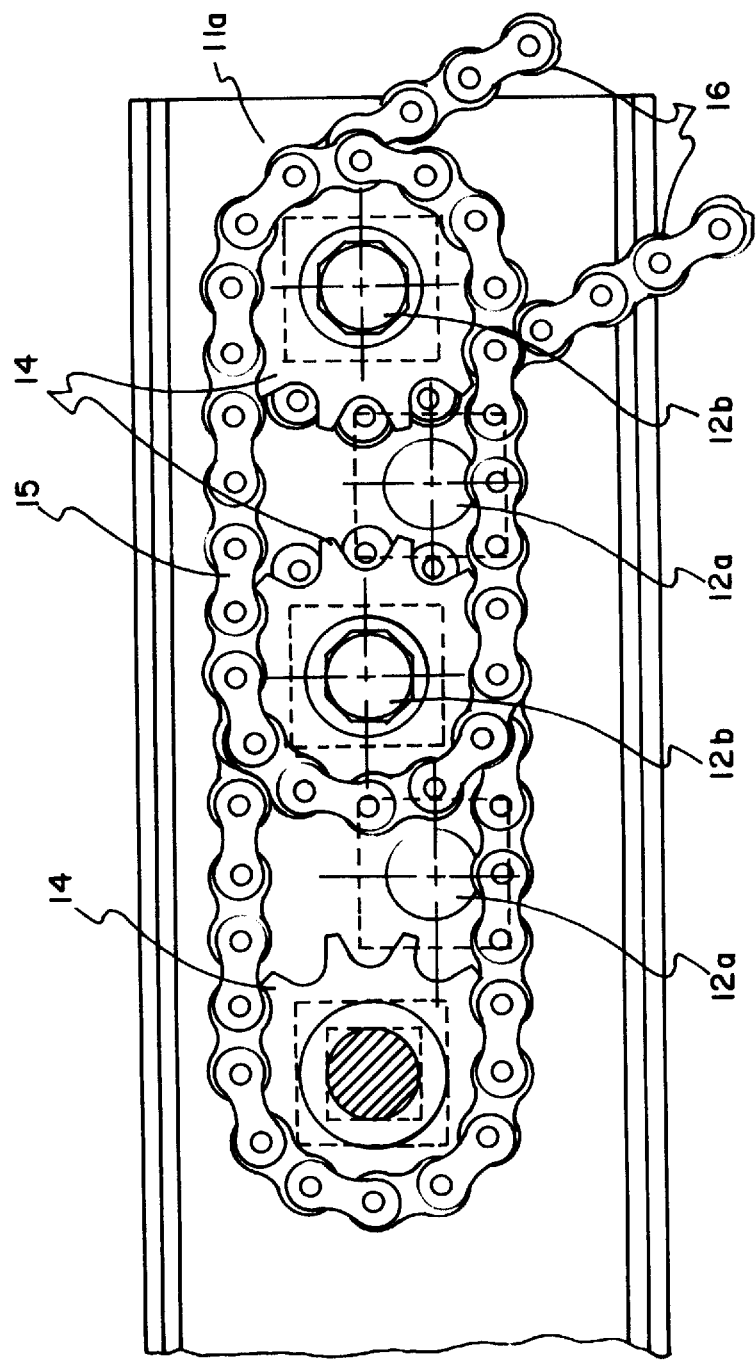
FIG. 4 is a fragmentary side elevational view of the power input and drive means of the present invention.

Each of the conveyor-cutter rollers 12 has one end that terminates in a shaft 12a which is adapted to be rotatively mounted on one of the end-frames by a bearing 13a. The opposite end of each of the conveyor-cutter rollers has an outwardly extending shaft 12b that passes through a bearing 13b on one of the end-frames 11 and has a sprocket fixedly secured thereto outboard of such frame. Every other conveyor-cutter roller has its shaft 12a mounted on the same end-frame, and every other shaft 12b is mounted on the opposite end-frame, thus staggering the rollers on each end-frame as can clearly be seen in FIG. 1. Also, the height of the alternating shafts 12a and 12b of the respective end-frame are alternately higher and lower as can clearly be seen in FIG. 4. This gives an elongated crossing configuration as seen in the end-elevational view in FIG. 2 and is what gives the conveyor rollers their scissors cutter action.

Each of the roller shafts 12b have a pair of sprockets 14 fixedly mounted thereon. Each sprocket in alignment with the adjacent sprocket has and endless chain 15 trained thereover as can clearly be seen in FIGS. 1 and 4.

One of the sprockets at one end of each of the end-frame has a power input chain 16 trained thereover. This input chain also is trained over a suitable source of rotative motion (not shown). Since sources of rotative power are well known to those skilled in the art of conveyors-separators, further detailed discussion of the same is not deemed necessary.

FIGS. 5a through 5d are all taken through the same section to exemplify the scissors cutting action of the present invention.

Figure 5A:
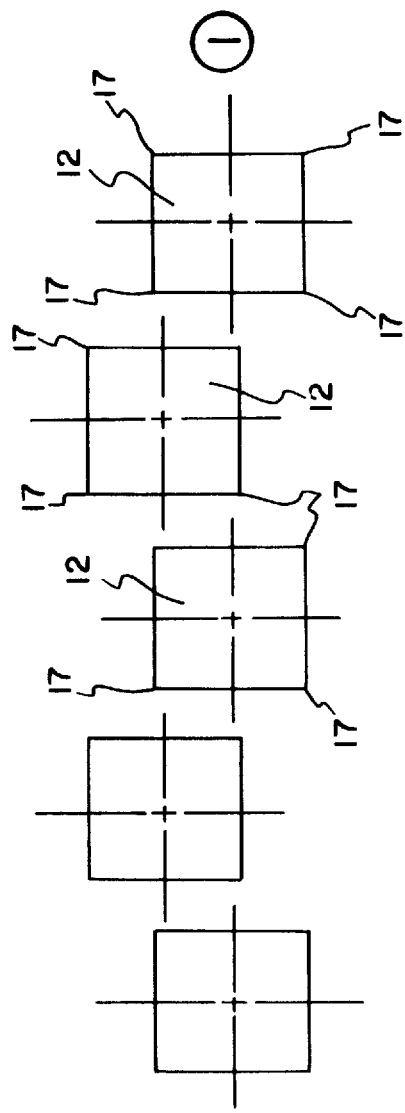
FIG. 5a is a sectional view of the conveyor rollers with their sides parallel to each other.
Figure 5B:
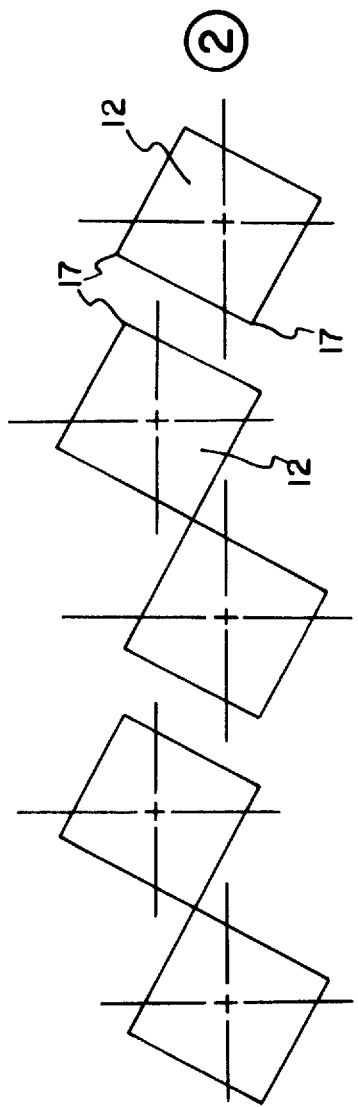
FIG. 5b is the same sectional view with the rollers turned to a point where sets of adjacent rollers are in scissors action contact with each other.

When the scissors-action-conveyor of the present invention is first set up, the sides of all of the rollers are parallel as shown in FIG. 5a. As the rollers begin to turn to move the peanuts or other crops across the same, the relatively sharp cutting corners 17 of each adjacent pair of rollers will contact each other as shown in FIG. 5b. If this contact is at one end of the rollers, as they continue to turn, the contact will continue to be made but the contact area will move due to the angular offset of each adjacent roller until the contact area is at the opposite end of the rollers in question. The rollers will then continue to turn until they are at their most open position as shown in FIG. 5a prior to the next cutting corner 17 coming in contact with different adjacent pairs of rollers to start the cutting action again as clearly shown in FIG. 5c. Again, if this sectional view is at one end of the rollers adjacent the side of the conveyor, then the scissors action area of contact will move along the rollers until the far end adjacent the opposite side of the conveyor is in contact.

The rollers then again move into parallel position as shown in FIG. 5a so the cut stems, roots, vines and other debris can fall therebetween before the next corner contact scissors cutting action begins. Which would be as shown in FIG. 5b.

Figure 5C:
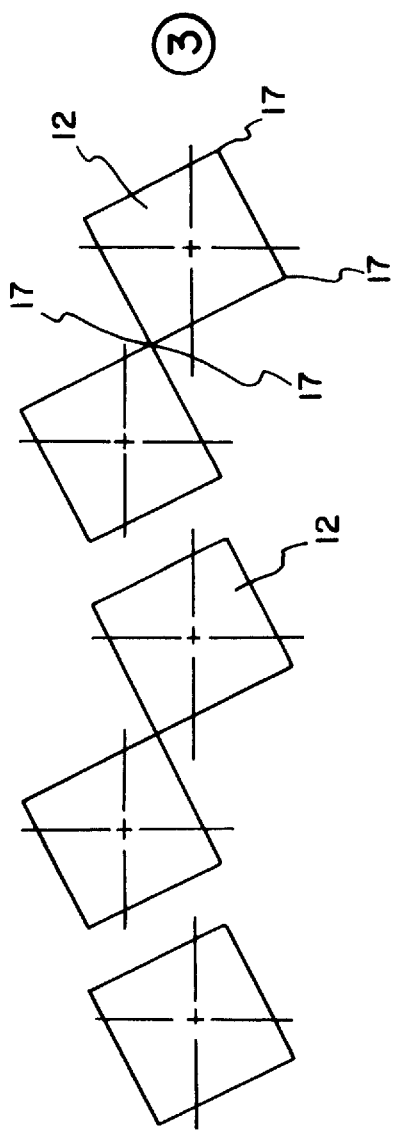
FIG. 5c is the same sectional view with different alternate pairs of adjacent rollers in scissors action contact.
Figure 5D:
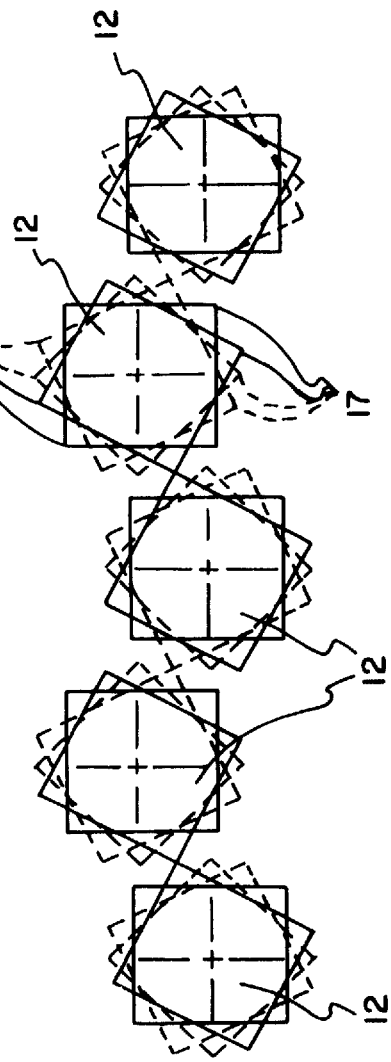
FIG. 5d is the same sectional view showing the same alternate scissors action between each of the adjacent cutting rollers.

FIG. 5d is an overlay of FIGS. 5a through 5c.

The scissors action separator-conveyor of the present invention can be constructed from rollers having more or less than four cutting corners 17. In other words three-sided, five-sided, etc. rollers could be used so long as the cutting edges give a scissors action from one end to the other as the cutting corners 17 come into contact with the adjacent rollers.

The conveyor of the present invention can be used anywhere that a scissors action cutting is desired to separate undesirable material such as, roots, hair-like growths, fuzz or the like from the product being processed.

The conveyor-separator of the present invention is particularly adapted for use with root crops, including but not limited to beets, carrots, peanuts, potatoes, radishes, rutabagas and the like.

In the harvesting of peanuts, the present method is to dig the peanuts, separate the dirt from the same, usually on a separator-conveyor, and then windrowing the same. After a three to five day drying period a conventional peanut combine is used to harvest the crop, separate the peanuts from the vines and deposit the vines back on the ground to later be plowed under. The peanuts are then removed for further processing.

If during the three to five day drying period high ambit moisture conditions are encountered such as rain, the harvesting of the crop can be delayed which invariably causes some of the peanuts to become loose on the vines and thus will fall to the ground and be lost during the harvesting process.

With the scissors action separator-conveyor of the present invention incorporated into a peanut digger, a different method of harvesting can be used.

This new method of harvesting peanuts includes either mowing and windrowing the vines to allow the same to dry prior to baling for use as hay, or forage harvesting the vines and transporting the same to a dehydrating plant so that the same can be processed into food products such as dog food, cattle feed, or possibly for human consumption.

Regardless of the use of the vines discussed above, once they have been cut, the peanuts will begin to partially dry in the ground and the roots will begin to loosen therefrom. After an appropriate interval, depending on climatic and other conditions, the peanuts can be dug in the conventional manner but will then be conveyed across the scissors action separator-conveyor of the present invention to remove dirt, roots and other debris therefrom. The peanuts can then be transferred to storage bins or baskets by conventional means for further processing in the conventional manner.

In the conventional harvesting of root type crops, a number of different separator-conveyors are used. The scissors action separator-conveyor of the present invention can be advantageously substituted for these various separator-conveyors of the various prior art harvesters and combines to more efficiently and completely separate such crops from dirt, roots and other debris.

The scissors action separator-conveyor of the present invention is ideally suited for use in harvesters where the food crop needs to be cleaned, dried and grade separated to produce a market-ready agricultural product.

The type of crop intake 18 used in conjunction with the crop harvester-processor 19 of the present invention will depend on whether the crop is dug after the foliage has been removed by mowing, forge harvesting, or the like, combining of crops that have previously been dug and air dried, or other harvesting means.

From the intake the crop moves across one or more scissors action separator conveyors until dirt and other debris has been separated from such crop. The crop then moves through a drying area 20. This area can be heated by one or more hot air furnaces, referred to as HAF in FIG. 6, commercial microwave dryers, or the like. Since crop intakes and crop dryers are well known to those skilled in the art, further detailed discussion of the same is not deemed necessary.

A series of scissors action separator-conveyors and dryers can be used to reduce the moisture content of the crop to accepted market levels. The peanuts then pass through a standard sizing separator-conveyor which grades the crop. Once the graded crop has been placed in separate bins or containers 22, it is ready to be removed from the harvester-processor 19 and taken to market with no additional processing being required.

Since sizing separator-conveyors as well as, graded crop storage containers and the like are well known to those skilled in the art, further detailed discussion of the same is not deemed necessary.

The operation of the harvester/processor of the present invention is illustrated in the block diagram of FIG. 7 wherein the appropriate crop intake 18 moves the crop to a scissors action separator-conveyor 10. The crop then passes over one or more such conveyors and into a drying area 20 which can be either a conventional gas fired forced air heater, a conventional microwave dryer or other suitable means for removing moisture from the crop. Additional series of scissors action separator conveyors and drying areas can be used as needed until the moisture content of the crop has been reduced to a marketable level. The crop is then passed onto a sizing separator-conveyor 21 where the crop is sized and deposited in graded crop storage containers 22 either within the harvester-processor 19 or exterior thereof. The size graded crop i.e. small, medium and large, can then be transported directly to market 24 by conventional transportation means 23 such as trucks or the like. Since transportation means for dried, graded crops are well known to those skilled in the art, further detailed description of the same is not deemed necessary.

From the above it can be seen that the present invention has the advantage of providing not only a means of separating dirt and other debris from root products but also providing a scissors cutting action for much more complete and efficient cleaning of such crops. By using the scissors action separator-conveyor in a harvester-processing system, a market-ready crop can be produced.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. The method of harvesting root type crops comprising: passing the crop through a crop intake of a harvester-processor: conveying said crop across at least on separator-conveyor including a plurality of multi-sided cylindrical rollers having sides intersecting at sharp corners that are mounted alternately at an angle to an adjacent roller at a distance that allows scissors action cutting contact between the sharp corners of the adjacent rollers as they are rotated to remove dirt, stems, roots, vines, and other debris from the crop; and passing the crop through at least one drying area to reduce moisture content to a marketable level.

2. The method of claim 1 wherein the harvester-processor dried crop is transported directly from such harvester-processor to market.

3. The method of claim 1 wherein the drying area is a microwave dryer.

4. The method as recited in claim 1 wherein said at least one drying area is at least one hot air furnace.

5. The method as recited in claim 4 wherein said hot air furnace is gas-fired.

6. A separator-conveyor for separating a crop into desirable product and undesirable material comprising:
a support frame having laterally spaced sides;
a plurality of cylindrical rollers including a first set and a second set, said rollers being rotatably supported on said sides of said support frame in longitudinally spaced alternating order and having rotational axes in parallel spaced relationship, said first set having rotational axes in a first plane and said second set having rotational axes in a second plane inclined with respect to said first plane, said cylindrical rollers being multi-sided with adjacent sides thereof intersecting at a corner, the longitudinal spacing between adjacent rollers establishing a cutting action between adjacent corners; and
means for cojointly rotating said first set and said second set whereby a crop fed onto said rollers is rotated and fed therealong with said desirable product being separated from said undesirable material by said cutting action.

7. The separator-conveyor as recited in claim 6 wherein said cylindrical rollers are four sided.

8. The separator-conveyor as recited in claim 6 wherein said cylindrical rollers are three sided.

9. The separator conveyor as recited in claim 6 wherein said cylindrical rollers are five sided.

10. The separator-conveyor as recited in claim 6 wherein the product being conveyed are root type crops.

11. The separator-conveyor as recited in claim 6 wherein said rotational axes of said first set and said rotational axes of said second set are equally and oppositely inclined.

12. The separator-conveyor as recited in claim 11 wherein said rollers are rotated in the same direction.

13. The separator-conveyor as recited in claim 12 wherein corresponding sides of said rollers are parallel.

14. The method of harvesting root type crops comprising the steps of: removing the above ground foliage from the crop; digging said crop; conveying the crop across a separator-conveyor including two sets of multisided rollers mutually inclined in alternating order to establish a scissors type cutting action therebetween as said rollers are rotated whereby dirt, stems, roots, vines and other debris can be removed from the crop being harvested; and transferring said crop from the separator-conveyor for further processing.

15. The method as recited in claim 14 wherein the foliage removed from the root type crop is further processed into a usable agricultural product.

16. The method as recited in claim 14 wherein said foliage is dehydrated and conventionally processed into animal feed.

* * * * *